United States Patent [19]
Hirano et al.

[11] Patent Number: 4,916,342
[45] Date of Patent: Apr. 10, 1990

[54] ROTARY ACTUATOR

[75] Inventors: Yoshiyuki Hirano, Yono; Yoshihiro Moribe, Chigasaki, both of Japan

[73] Assignee: Hitachi, Ltd., Tokyo, Japan

[21] Appl. No.: 317,723

[22] Filed: Mar. 2, 1989

[51] Int. Cl.$^4$ .......................... H02K 5/24; H02K 3/00; G11B 5/55; F16F 15/22

[52] U.S. Cl. ...................................... 310/51; 310/208; 310/36; 360/106; 74/573 R

[58] Field of Search .............. 360/97.03, 97.04, 98.01, 360/98.02, 98.03, 98.04, 98.05, 98.06, 98.07, 98.08, 99.01, 99.02, 99.03, 99.04, 99.05, 99.06, 99.07, 99.08, 99.09, 99.11, 99.12, 106; 310/12, 13, 14, 51, 36, 208; 74/573 R

[56] References Cited
U.S. PATENT DOCUMENTS

| | | | |
|---|---|---|---|
| 4,346,416 | 8/1982 | Riggle | 360/106 |
| 4,658,313 | 4/1987 | Takahashi | 360/98.06 |
| 4,864,447 | 9/1989 | Takekado et al. | 360/106 |

OTHER PUBLICATIONS

J. S. Heath, "Design of a Swinging Arm Actuator for a Disk File", IBM Journal of Research and Development, Jul., 1976, pp. 389–397.

Yoshifumi Mizoshita and Nakahiko Matsuo, "Mechanical and Servo Design of a 10 Inch Disk Drive", IEEE Transactions on Magnetics, vol. MAG-17, No. 4, Jul., 1981, pp. 1387–1391.

*Primary Examiner*—Patrick R. Salce
*Assistant Examiner*—C. LaBalle
*Attorney, Agent, or Firm*—Kenyon & Kenyon

[57] ABSTRACT

In a rotary actuator including a voice coil motor having a coil fitted to the other end portion of a carriage fixed to a rotary shaft and having a load at one of the end portions thereof, the rotary actuator of the present invention is characterized in that the rotation on the coil side and the rotation on the load side with respect to the rotary shaft are balanced. The weight of the coil is adjusted by forming the coil by at least two kinds of coil wires having different specific gravities, and where a plurality of coils are disposed on the outer side of the rotary shaft, the weight of the coil on the load side is made smaller than that of the coil on the opposite side.

5 Claims, 3 Drawing Sheets

ROTARY ACTUATOR

BACKGROUND OF THE INVENTION

1. Field of the Invention

This invention relates to a rotary drive unit for preventing the occurrence of vibration of a rotary shaft and more particularly to an improvement in a rotary drive unit or so-called "rotary actuator" which will be suitable for locating the head of a magnetic disk to a desired position of a disk surface.

2. Description of the Prior Art

The following techniques are known as the prior art techniques for the rotary actuator for locating the head of a magnetic disk.

The first of the prior art techniques is described in "IBM Journal of Research and Development", July, 1976, pp. 389-397. According to this reference, a carriage equipped with the head at one of its end portions is fitted to the rotary shaft and a coil of a voice coil motor is fitted to the opposite side of the carriage with the rotary shaft as the center or in other words, to the other end portion of the carriage. Since magneto-electric interaction occurs between the coil of the voice coil motor and a magnetic circuit, the coil is driven around the axis of the rotary shaft together with the carriage and with the rotary shaft and the head can thus be located to a desired position of the disk.

The second of the prior art techniques is described in "IEEE, TRANS. MAGNETICS", MAG17 (1981), pp. 1387-1395. In this reference, a carriage having a head at one its end portions is fitted to a rotary shaft and the coil of a voice coil motor is directly fitted to this rotary shaft. The coil consists of two coils that are disposed at mutually symmetric positions on the outer side of the rotary shaft and one of the coils is disposed at one of the end portions of the carriage with the other being disposed at the other end of the carriage.

In the rotary actuator for use in the magnetic disk, the head moves and is located with an accuracy of a micron order on the disk. Unless precise balance is established around the rotary shaft, therefore, vertical force acts on the rotary shaft and vibration is likely to occur. It is therefore necessary to carefully consider the arrangement wherein the weight on the load side such as the head is in equilibrium with the weight on the opposite side with respect to the rotary shaft when dimensions of constituent components are determined.

An aluminum wire having a smaller specific gravity than a copper wire is generally used for the coil of the voice coil motor in order to improve response of the head.

In accordance with the first prior art technique described above, the coil of the voice coil motor is fitted to the other end portion of the carriage which is equipped with the head at one of its ends. However, since the coil is much lighter than the load such as the head, a balance weight is fitted to the other end of the carriage to establish the balance. If a copper wire having a greater specific gravity is used for the coil in this case, the coil is by far heavier than the load. Though a balance weight may be fitted to one of the ends of the carriage to establish the balance, the total weight of the apparatus becomes further greater and response of the head will drop undesirably.

In accordance with the second prior art technique described above, the coil consists of two coils that are disposed symmetrically. Therefore, though the coil balances itself but since one of the coils is disposed on the same side as the head, the other coil side is lighter so that the balance weight must be fitted to the other end of the carriage in the same way as in the first prior art technique.

However, the first and second prior art techniques involve the drawbacks in that they require more complicated assembly line because they use the balance weight, an extra space is necessary for the balance weight and since vibration resulting from the balance weight occurs, total vibration cannot be reduced.

SUMMARY OF THE INVENTION

In view of the problems with the prior art techniques described above, the present invention is directed to provide a rotary actuator which can easily establish the balance of rotation around the rotary shaft without using any specific component such as the balance weight and can moreover reduce vibration.

In a rotary actuator including a rotary shaft supported rotatably, a carriage fixed to the rotary shaft and having a load at one of the end portions thereof and a voice coil motor having a coil fitted to the carriage on the opposite side to the load, that is, at the other end of the carriage with respect to the rotary shaft, the rotary actuator in accordance with the present invention is characterized in that the coil of the voice coil motor is adjusted on the basis of the weight of the load and the rotation on the coil side and the rotation on the load side are balanced with respect to the rotary shaft.

The weight of the coil is adjusted, for example, by forming the coil by the combination of a plurality of kinds of coil units made of materials having different specific gravities and in this manner, the necessity for disposing the balance weight of the carriage can be eliminated.

As a result, since the balance weight becomes unnecessary, man-hours for the assembly of the balance weight can be reduced and its space can be eliminated. Moreover, vibration resulting from the balance weight can be eliminated and total vibration can be reduced.

The weight of the coil is adjusted by winding wires in such parallel windings as required by the number of a plurality of kinds of coil wires having different specific gravities and the balance weight can thus be eliminated. Accordingly, the same effect as described above can be obtained, too.

Furthermore, the voice coil motor is composed of a plurality of coils fitted to the outer side of the rotary shaft and each coil is formed by a coil wire having a specific gravity which corresponds to its position on the outer side of the rotary shaft, in order to adjust the weight of the coil. In this manner, the balance weight becomes unnecessary and the same effect as described above can be obtained, too.

The foregoing and other objects, advantages, manner of operation and novel features of the present invention will be understood from the following detailed description when read in conjunction with the accompanying drawings.

DESCRIPTION OF THE PREFERRED EMBODIMENTS

Hereinafter some preferred embodiments of the present invention will be described with reference to FIGS. 1 to 6.

Figure 1:
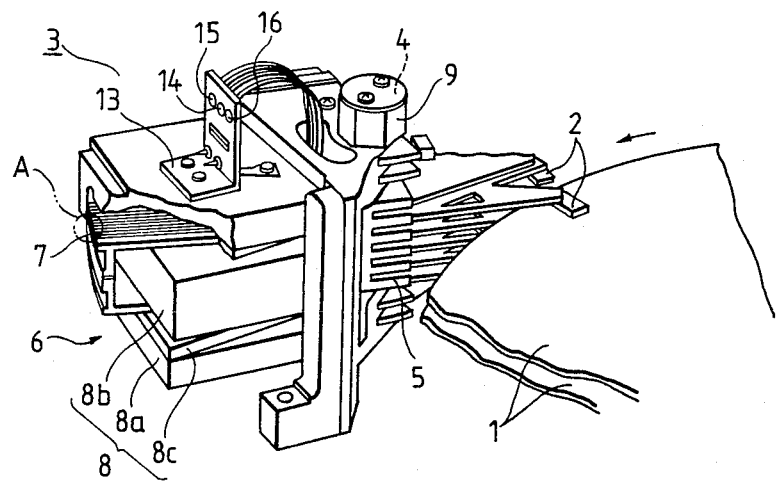
FIG. 1 is a cut-away perspective view of a magnetic disk to which the first embodiment of the present invention applies.
Figure 2:
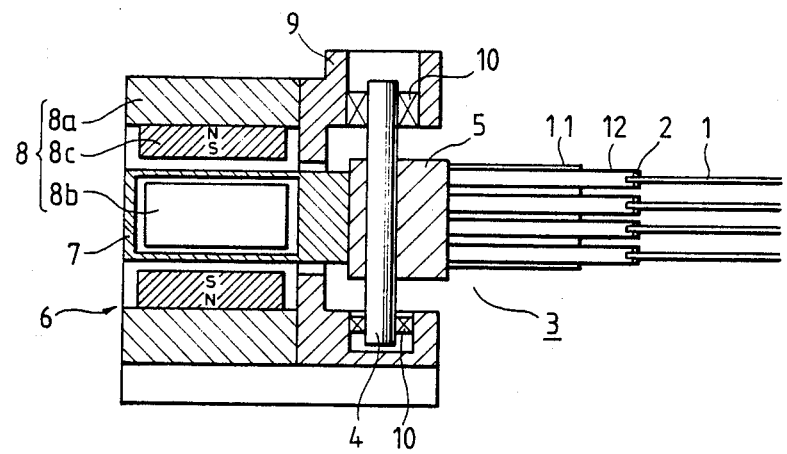
FIG. 2 is a longitudinal sectional view of a rotary actuator.
Figure 3:
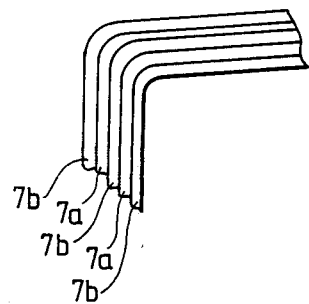
FIG. 3 is an explanatory view useful for explaining the formation state of a coil of a voice coil motor.
Figure 4:
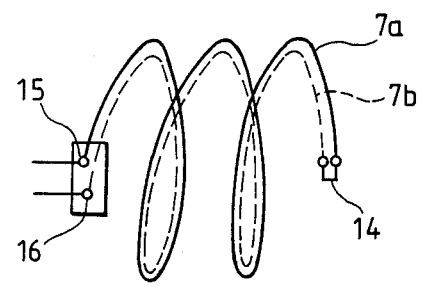
FIG. 4 is an explanatory view useful for explaining the connection of the coil.

FIG. 1 is a cut-away perspective view showing a magnetic disk to which the first embodiment of the present invention applies, FIG. 2 is a longitudinal sectional view of a rotary actuator and FIGS. 3 and 4 are explanatory views useful for explaining the formation state of a coil of a voice coil motor and the connection state of the coil, respectively.

In the magnetic disk shown in FIG. 1, a plurality of disks 1 are fitted to the rotary shaft of a motor (not shown) and when the disks 1 are driven by the motor for rotation, a head 2 is located to a desired position on the surface of the disk 1 by a rotary actuator 3.

The rotary actuator 3 includes a rotary shaft 4 supported rotatably on its axis, a carriage 5 fixed to the rotary shaft 4 and a voice coil motor 6.

The rotary shaft 4 is supported by bearings 10, 10 disposed at the upper and lower positions inside a housing 9 and can rotate on the axis. The housing 9 is fixed to a base (not shown) of the magnetic disk.

The carriage 5 is fixed at the intermediate position of the rotary shaft 4 between the bearings 10, 10 and is equipped with the head 2 as the load at one of its end portions with the rotary shaft 4 as the center. The head 2 is supported by a guide arm 11 at one of the ends of the carriage 5 through a load arm 12 consisting of a spring and is biased to the surface of the disk 1 by the spring force of the load arm 12.

The voice coil motor 6 has a coil 7 fitted to the carriage 5 and a driving circuit 8 for driving the coil 7. The coil 7 is fitted to the other end of the carriage 5 on the opposite side to the head 2 with the rotary shaft 4 as the center. This coil 7 is connected to a terminal plate 13 which is fixed to the carriage 5. On the other hand, the driving circuit 8 of the voice coil motor 6 consists of a yoke 8a equipped with a center pole which inserts through the coil 7 at its center, and permanent magnets 8c, 8c which are disposed at the upper and lower positions inside the yoke 8a and has substantially the same length as the center pole 8b. When a current is applied to the coil 7, magneto-electric interaction occurs between the coil 7 and the magnetic circuit 8 consisting of the permanent magnet 8c, the yoke 8a and the center pole 8b so that the coil 7 is driven.

Accordingly, when the coil 7 of the voice coil motor 6 is driven, the carriage 5 rotates around the axis of the rotary shaft 4 and the head 2 can be located to a desired position on the surface of the disk 1.

In this embodiment, however, the coil 7 of the voice coil motor 6 is formed by winding two kinds of coil wires having different specific gravities and its weight is adjusted in accordance with the weight of the load such as the head 2 in order to balance the rotation around the axis of the rotary shaft 3.

A copper wire 7a having a larger specific gravity and an aluminum wire 7b having a smaller specific gravity, for example, that are shown in FIG. 3 are used as the two kinds of coil wires described above and these copper wire 7a and aluminum wire 7a, 7b are wound in two parallel windings to form the coil 7. Since the coil consists of the copper wire 7a and the aluminum wire 7b in this case, its weight is adjusted in accordance with the weights of the loads such as the head 2, the guide arm 11 and the load arm 12 and the rotation around the axis of the rotary shaft 4 can thus be balanced.

Incidentally, one of the ends of each of the copper wire 7a and the aluminum wire 7b forming the coil 7 is connected to a terminal A14 of a terminal plate 13 and the other end, to terminals B15 and C16 on the terminal plate 13.

In the rotary actuator of the embodiment described above, since the copper wire 7a and the aluminum wire 7b are wound into two parallel windings to form the coil 7, the weight is increased by the weight of the copper wire 7a so that the weight of the coil can be adjusted in accordance with the weights of the loads such as the head 2, the load arm 12 and the guide arm 11 and the rotation around the axis of the rotary shaft 3 can thus be balanced. As a result, it is no longer necessary to dispose a balance weight to the carriage on the opposite side to the head as has been necessary in the prior art techniques. Moreover, since the copper wire 7a and the aluminum wire 7b are wound into two parallel windings to form the coil 7, the center of gravity of the coil does not deviate.

Though the embodiment described above represents the example where the two kinds of coil wires, i.e. the copper wire 7a and the aluminum wire 7b, are wound into two parallel windings to form the coil 7 but it is also possible to form the coil by winding three kinds of coil wires into three parallel windings and to adjust its weight. In other words, the coil 7 can be formed by winding a plurality of kinds of coil wires in such parallel windings as required by the number of kinds.

Figure 5:
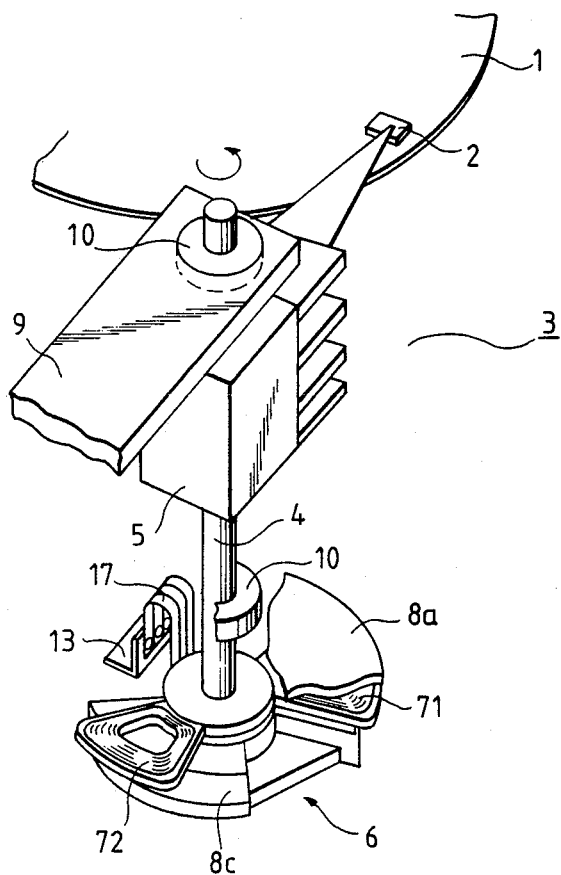
FIG. 5 is a cut-away perspective view showing another embodiment of the present invention.
Figure 6:
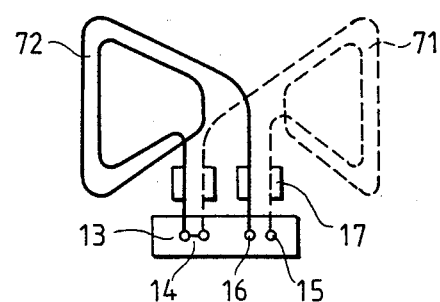
FIG. 6 is an explanatory view useful for explaining the connection of each coil at the coil portion of the voice coil motor.

FIGS. 5 and 6 show another embodiment of the present invention.

In the rotary actuator of this embodiment, the coil 7 of the voice coil motor 6 consists of two coils 71, 72 that are disposed in symmetric positions on the outer side of the rotary shaft 4. One 71 of the coils is disposed on the outer side of the rotary shaft 4 on the same side as the head 2, that is, on the same side as one of the end portions of the carriage 5 and the other coil 72 is disposed on the opposite side to the coil 71, that is, on the same side as the other end portion of the carriage 5.

As shown in FIG. 6, one end of each of the coils 71, 72 is connected to the terminal A14 on the terminal plate 13 and the other end is connected respectively to the terminals B15 and C16 of the terminal plate 13. Reference numeral 17 represents a flat cable that connects each coil 71, 72 to the terminal plate 13.

One of the coils (71) is formed by the aluminum wire having a smaller specific gravity while the other (72) is formed by the copper wire having a larger specific gravity to provide them with difference in weight. Accordingly, the rotation around the rotary shaft 4 can be balanced by adjusting the weight of the coil 7 as a whole in accordance with the weights of the loads such as the head 2.

Accordingly, in accordance with this embodiment, the two coils 71, 72 are composed of the coil wires having different specific gravities and the rotation around the rotary shaft 4 can be balanced by adjusting the weight of the coil 7. In this manner this embodiment can provide the same effect as that of the first embodiment and since each of the coils 71, 72 is formed by one kind of coil wire, the weight of each coil 71, 72 can be adjusted easily.

Though the embodiment described above represents the case where the coil 7 consists of the two coils 71, 72, it may consist of three or more coils and the same effect can be obtained by adjusting the weight of each coil in accordance with each position on the outer side of the rotary shaft 4. Moreover, if each coil is formed by a plurality of kinds of coil wires, the same effect can be obtained in the same way as in the first embodiment though the weight adjustment of each coil is more complicated.

In short, the present invention forms the coil 7 by a plurality of kinds of coil wires so as to balance the rotation around the rotary shaft 4 and adjusts the weight of the coil 7.

In accordance with the present invention described above, the coil of the voice coil motor is formed by a plurality of kinds of coil wires having different specific gravities, the weight of the coil is adjusted in accordance with the weights of the loads fitted to one of the end portions of the carriage and the rotation around the axis of the rotary shaft is balanced. Accordingly, it is not necessary to attach any balance weight so that man-hours for the assembly can be reduced and the space therefor can be omitted. Moreover, since vibration resulting from a balance weight can be eliminated, vibration itself can be reduced.

In accordance with the present invention, a plurality of kinds of coil wires having different specific gravities are wound in such parallel windings as required by the number of kinds of the coil wires to form the coil and the weight of the coil is adjusted so that the balance weight can be eliminated. Therefore, the same effect as described above can be obtained.

In accordance with the present invention, further, the coil of the voice coil motor is formed by a plurality of coils fitted to the outer side of the rotary shaft and each coil is formed by coil wires having specific gravities varying in accordance with the positions of the coil wires on the outer side of the rotary shaft. Therefore, when the weight of the coil is adjusted, the balance weight can be eliminated and the same effect as described above can be obtained.

What is claimed is:

1. A rotary actuator comprising:
  a rotatably supported rotary shaft;
  a carriage having two ends, a first end being on a first side of said rotary shaft and a second end being on a second side of said rotary shaft opposite to said first end, said carriage being fixed to said rotary shaft and having a load at said first end; and
  a voice coil motor having a coil comprising a plurality of kinds of coil portions made of materials having different specific gravities, said coil being fitted to said carriage at said second end opposite to said first end;
  wherein said coil portions of said voice coil motor disposed on the second end of said carriage balance the rotation on the side of the rotary shaft on which the coil is disposed and the rotation on the side of the rotary shaft on which said load is disposed.

2. A rotary actuator according to claim 1, wherein said plurality of kinds of coil portions are made of conductor wires having different specific gravities.

3. A rotary actuator according to claim 2, wherein said conductor wires includes a copper wire and an aluminum wire.

4. A rotary actuator according to claim 1, wherein said coil of said voice coil motor is fitted to said second end of said carriage on the opposite side of said load with respect to said rotary shaft as the center, said coil portions being formed by winding a plurality of kinds of coil wires having different specific gravities in such parallel windings as required by the number of kinds of said coil portions so as to adjust the weight of said coil by combining said coil wires.

5. A rotary actuator comprising:
  a rotatably supported rotary shaft;
  a carriage having first and second ends and being fixed to said rotary shaft; and
  a voice coil motor having a coil, wherein said coil comprises a plurality of coil portions, said portions being fitted to an outer perimeter of said rotary shaft wherein at least a first coil portion of said plurality of coil portions is disposed on a first side of said rotary shaft wherein said load is disposed on the same first side of said rotary shaft and wherein said coil portion on said first side of said rotary shaft is formed by a coil wire having a first specific gravity and at least a second coil portion being disposed on a second side of said rotary shaft opposite to said first side wherein said second coil portion is formed by a second coil wire having a second specific gravity and wherein said first specific gravity is lighter than said first specific gravity.

* * * * *

UNITED STATES PATENT AND TRADEMARK OFFICE
CERTIFICATE OF CORRECTION

PATENT NO. : 4,916,342
DATED : 10 April 1990
INVENTOR(S) : Yoshiyuki HIRANO et al.

It is certified that error appears in the above-identified patent and that said Letters Patent is hereby corrected as shown below:

| Column | Line | |
|---|---|---|
| TITLE PAGE | 6 | After "[22] Filed: Mar. 2, 1989" insert --[30]  Foreign Application Priority Data<br>    March 9, 1988 [JP] Japan ........... 63-53790-- |
| 1 | 32 | After "one" insert --of--. |
| 4 | 4 | Change "these" to --this--. |
| 5 | 19 | Change "adjusts" to --adjust--. |
| 6 | 50 | Change "first" to --second--. |

Signed and Sealed this

Eighth Day of October, 1991

*Attest:*

HARRY F. MANBECK, JR.

*Attesting Officer*   *Commissioner of Patents and Trademarks*